US007193633B1

(12) United States Patent
Reinhardt et al.

(10) Patent No.: US 7,193,633 B1
(45) Date of Patent: Mar. 20, 2007

(54) METHOD AND APPARATUS FOR IMAGE ASSISTED MODELING OF THREE-DIMENSIONAL SCENES

(75) Inventors: Tilman Reinhardt, Woodside, CA (US); Robert Seidl, Portola Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/562,212

(22) Filed: Apr. 27, 2000

(51) Int. Cl.
*G09G 5/00* (2006.01)
*G06T 17/00* (2006.01)

(52) U.S. Cl. .............. 345/629; 345/420; 345/619; 345/632

(58) Field of Classification Search ........ 345/419, 345/420, 429, 427, 619, 632–633, 627, 629, 345/582, 620
See application file for complete search history.

(56) References Cited

U.S. PATENT DOCUMENTS

| | | | | |
|---|---|---|---|---|
| 4,969,036 | A | | 11/1990 | Bhanu et al. ............... 358/105 |
| 4,970,666 | A | * | 11/1990 | Welsh et al. ................ 345/423 |
| 5,255,352 | A | * | 10/1993 | Falk ........................... 345/582 |
| 5,511,153 | A | * | 4/1996 | Azarbayejani et al. ...... 345/419 |
| 5,699,444 | A | | 12/1997 | Palm .......................... 382/106 |
| 5,714,997 | A | * | 2/1998 | Anderson ..................... 348/39 |
| 5,745,117 | A | * | 4/1998 | Masuda et al. ............. 345/420 |
| 5,748,199 | A | * | 5/1998 | Palm .......................... 345/419 |
| 5,990,900 | A | * | 11/1999 | Seago ........................ 345/419 |
| 5,990,901 | A | * | 11/1999 | Lawton et al. ............. 345/581 |
| 6,016,147 | A | * | 1/2000 | Gantt ......................... 345/420 |
| 6,025,847 | A | * | 2/2000 | Marks ........................ 345/419 |
| 6,037,948 | A | * | 3/2000 | Liepa ......................... 345/582 |
| 6,046,745 | A | * | 4/2000 | Moriya et al. .............. 345/420 |
| 6,058,259 | A | * | 5/2000 | Murakami .................... 703/2 |

(Continued)

OTHER PUBLICATIONS

"Photographic Lens", Wikipedia, the free encyclopedia, 2006, pp. 1-4.*

(Continued)

*Primary Examiner*—Kee M. Tung
*Assistant Examiner*—Chante Harrison
(74) *Attorney, Agent, or Firm*—Robert C. Kowert; Meyertons, Hood, Kivlin, Kowert & Goetzel, P.C.

(57) ABSTRACT

A computer-assisted technique for constructing a three-dimensional model on top of one or more images (e.g., photographs) such that the model's parameters automatically match those of the real world object depicted in the photograph(s). Camera parameters such as focal length, position, and orientation in space may be determined from the images such that the projection of a three-dimensional model through the calculated camera parameters matches the projection of the real world object through the camera onto the image surface. Modeling is accomplished using primitives, such as boxes or pyramids, which may be intuitively manipulated to construct the three-dimensional model on a video display or other display screen of a computer system with a two-dimensional input controller (e.g., a mouse, joystick, etc.) such that the displayed three-dimensional object manipulation emulates physical three-dimensional object manipulation. Camera and primitive parameters are incrementally updated to provide visual feedback of the effect of additional constraints on the three-dimensional model, making apparent which user action may have been responsible for any failure to provide a modeling solution and, thus, allowing for rapid reversal and correction thereof. Surface properties (i.e., textures) may be extracted from the images for use in the three-dimensional model.

2 Claims, 8 Drawing Sheets

U.S. PATENT DOCUMENTS

| | | | |
|---|---|---|---|
| 6,166,744 A * | 12/2000 | Jaszlics et al. | 345/435 |
| 6,208,347 B1 * | 3/2001 | Migdal et al. | 345/419 |
| 6,545,673 B1 * | 4/2003 | Shiitani et al. | 345/418 |
| 6,628,819 B1 * | 9/2003 | Huang et al. | 382/154 |
| 2001/0005425 A1 * | 6/2001 | Watanabe et al. | 382/154 |
| 2003/0044073 A1 * | 3/2003 | Matsugu et al. | 382/195 |
| 2005/0091019 A1 * | 4/2005 | Clavadetscher | 703/8 |
| 2006/0227133 A1 * | 10/2006 | Petrov et al. | 345/419 |

OTHER PUBLICATIONS

Richard Szeliski and Heung-Yeung Shum, "Creating Full View Panoramic Image Mosaics and Environment Maps", *Siggraph*, pp. 251-258 (Aug. 3-8, 1997).

Steven M. Seitz and Charles R. Dyer, "View Morphing", *Computer Graphics Proceedings, Annual Conference Series*, pp. 21-30 (1996).

Marc Levoy and Pat Hanrahan, "Light Field Rendering", *Computer Graphics Proceedings, Annual Conference Series*, pp. 31-42 (1996).

Steven J. Gortler et al., "The Lumigraph", *Computer Graphics Proceedings, Annual Conference Series*, pp. 43-54 (1996).

James D. Foley et al., "Computer Graphics: Principles and Practice", *Addison-Wesley Publishing Company*, Second Edition pp. 603-647 (1987).

Michael Gleicher and Andrew Witkin, "Through-the-Lens Camera Control", *Carnegie Mellon University Pittsburgh, PA*, pp. 331-340 (1992).

Michael Kass, "Condor: Constraint-Based Dataflow", *Computer Graphics*, vol. 26, No. 2, pp. 321-330 (Jul. 1992).

Robert M. Haralick and Linda G. Shapiro, "Computer and Robot Vision", pp. 116-151.

Paul S. Heckbert, "Fundamentals of Texture Mapping and Image Warping", *Computer Science Division University of California Berkeley*, pp. 1-87 (Jun. 1989).

Tzay T. Young, "Handbook of Pattern Recognition and Image Processing: Computer Vision", vol. 2, pp. 1-5.

J.M. Ogden et al., "Pyramid-Based Computer Graphics", *RCA Corp.*, Reprint RE-30-5-1, pp. 4-15, (Sep./Oct. 1985).

Jeremy S. De Bonet, "Multisolution Sampling Procedure for Analysis and Synthesis of Texture Images", *Computer Graphics Proceedings, Annual Conference Series*, pp. 361-368, (Aug. 3-8, 1997).

Camillo J. Taylor & David J. Kriegman, "Minization on The Lie Group SO(3) and Related Manifolds", *Yale University*, Technical Report No. 9405, pp. 1-8, (Apr. 1994).

B. Vijayakumar et al., "Structure and Motion of Curved 3D Objects from Monocular Silhouettes", *Dept. of Electrical Engineering Yale University & Computer Science University of Illinois*, pp. 1-8 (1996).

Camilo J. Taylor & David J. Kriegman, "Structure and Motion From Line Segnants In Multiple Images", *Dept. of Electrical Engineering Yale University*, pp. 1-31.

Shenchang Eric Chen & Lance Williams, "View Interpolation for Image Synthesis", *Apple Computers, Inc.*, pp. 279-288 (1993).

Youichi Horry et al., "Tour Into the Picture: Using a Spidery Mesh Interface to Make Animation from a Single Image", *Computer Graphics Proceedings, Annual Conference Series*, pp. 225-232 (1997).

* cited by examiner

FIG. 8 ing the field of photogrammetry and computer-assisted three-dimensional modeling. In particular, the present invention relates to the determination of camera parameters, and locations and dimensions of objects as seen in one or more digital representations of photographs or images.

METHOD AND APPARATUS FOR IMAGE ASSISTED MODELING OF THREE-DIMENSIONAL SCENES

RELATED APPLICATION

The subject matter of this application is a division under 37 C.F.R §1.53(b) of and claims priority under 35 U.S.C. §121 to a co-pending non-provisional application by the same inventors as the instant application entitled, "Method and Apparatus for Image Assisted Modeling of three-dimensional scenes," having Ser. No. 09/062,512, and filing date 17 Apr. 1998, now U.S. Pat. No. 6,333,749.

The subject matter of this application is related to the subject matter in a co-pending non-provisional application by the same inventors as the instant application and entitled, "Multi-Source Texture Reconstruction and Fusion," having Ser. No. 09/094,078, and filing date 9 Jun. 1998, now U.S. Pat. No. 6,281,904 B1.

FIELD OF THE INVENTION

The present invention relates to the fields of photogrammetry and computer-assisted three-dimensional modeling. In particular, the present invention relates to the determination of camera parameters, and locations and dimensions of objects as seen in one or more digital representations of photographs or images.

BACKGROUND

The task of extracting three-dimensional (i.e., spatial) information, such as location, orientation, and dimensions, of objects from two-dimensional (i.e., flat) photographs has been studied for many years. The general field can be divided into two major areas: camera reconstruction, which relates to the field of photogrammetry, and three-dimensional modeling, which is now a subset of the larger field of computer graphics, for example, as applied in computer-aided design of architecture, industrial design, and construction. Each of these fields has developed certain techniques of interest to the present invention.

For example, in the science of photogrammetry, algorithms have been developed to extract information about the camera with which a picture has been taken. This includes so-called internal parameters, such as the focal length and distortions of the camera lens(es), and data regarding the imaging plane of the camera, as well as external parameters, such as the location and orientation of the camera. Generally, these techniques have been based on two or more images with a set of known points correlating in each image.

The aim of photogrammetric methods and systems is to provide precise measurements of real world objects. To this end, stereoscopic cameras and reconstruction workstations have been developed. They often require specific (i.e., calibrated) cameras with known focal lengths, optical and spatial separations, projections, and other characteristics to allow accurate reconstruction on the camera parameters. In addition, some conventional photogrammetric techniques require that one or more points in the "scene" shown in the photographs have locations or inter-point distances which are known in advance. This can be very difficult, as it may require access to the exterior of buildings, landmarks, or other structures which may be impossible. Perhaps most importantly, in terms of the drawbacks of such techniques as viewed from the focus of the present invention, photogrammetric schemes of the past typically do not provide outputs in the form of complete three dimensional models and rarely, if ever, provide any texturing information for objects in a scene.

Three-dimensional modeling applications, on the other hand, have as a primary objective the production of such models. The need for such techniques is felt in a number of ways. For example, it is often desirable to have a three-dimensional model, complete with a description of shape, location, orientation, and material surface properties (i.e., texture), in order to produce realistic renderings on a computer which can be used to document a new design of a city, a building, or an object. The model can also be used for computer animations, virtual reality immersion of users in a scene, or for manufacturing tasks.

However, constructing digital three-dimensional models is not a trivial task. In general, it requires considerable training and skill and there tend to be far fewer individuals who are capable of producing such models than are capable, say, of producing text documents or spreadsheets (or other computer generated outputs for that matter). Computer-assisted three-dimensional modeling techniques of the past tend to require users to construct the models from "scratch" by starting with an empty scene and building up the model one object at a time. For each object to be placed in the scene, considerable data is required and such data must be accurately known in order to create a realistic and accurate model. For example, the shape, in terms of the form of points on the surface of the object to be modeled, the object's location, size and orientation, and often its spatial relationship to other objects in the scene must all be known before a user begins to create the model. Further, when an object to be modeled does not yet exist in the real world, such as is the case with, say, a new building or interior design, the only way to create the scene is with a model. But, in many cases, other buildings, mechanisms, or environments into which the new design will be introduced already exist and must be accounted for in the model. The previous modeling techniques thus require a great deal of measuring, data entry, and checking before the model can be created.

In a few cases, some modeling applications allowed a finished model to be matched up with an underlaid photograph to give the impression that the new model is part of the photograph. However, the model itself still had to be constructed "in a vacuum" using the labor intensive techniques described above. Moreover, because the underlaid image or photograph was flat (i.e., two-dimensional), one could not create an animation or immersive virtual reality environment from it, as any changes in viewpoint would make the flatness of the underlaid image apparent. One example of such a product was Alias Upfront, which apparently was intended for architectural applications but which is believed to have been discontinued. In general, this software package allowed a user to first create a model of a scene using conventional computer-modeling techniques and then, as a post-process, allowed for positioning a primitive on top of a photograph underlaid in the model. Thus, a camera was roughly matched and the previously created three-dimensional model could be rendered superimposed on top of the photograph with correct perspective. No modeling was done from the photograph nor was the camera model very precise.

More recently, there have been attempts (both in the commercial and academic worlds) to help in the creation of three-dimensional models by using photographs of existing objects. In some cases, these techniques require the use of multiple photographs and/or explicitly marked points on the surfaces of the objects to be modeled. Such schemes thus require a user to first point out the significant (e.g., previously marked) points on the object's geometry. Next, for each such point, the corresponding point, if visible, in each other image must be marked. Following this inter-image correlation, edges between the points must be marked and, then, faces defined by the edges marked, e.g., by indicating loops of the edges. All of these matching and marking steps can be very labor intensive, akin to modeling objects from scratch.

In addition, previous approaches to the modeling problem also often involve algorithms that run in "batch" mode. That is, a user must create all of the input data (e.g., vertices, edges, associations, etc.) and then invoke the modeling method. The modeling algorithms then complete all of the required calculations before providing any feedback to the user. Sometimes, because of inconsistent or undetermined input information, or due to singularities in the modeling algorithms themselves, these batch processes cannot return correct or even useful models. Even worse, such algorithms often provide little or no indication of what the cause of the problem was, or where the user might correct the input information to resubmit to the batch process.

One recent software application, known as 3D Builder, available from 3D Construction Company, allows modeling of complex curved surfaces (e.g., human faces) but requires that users mark many points on the real world object to be modeled before taking a photograph thereof. During the modeling, a point is created in the model for each marked point on each photograph and the corresponding points in the different photographs must be associated with one another in the model. Once the points have been correlated, edges can be constructed between the points and faces created between the edges. This is a very labor intensive process and requires the use of a number of "atomic" entries (the points) to achieve high accuracy. Only after all of the points, edges and faces have been created does the modeling process run in a batch mode (as opposed to a user interactive mode) to (hopefully) generate the resulting three-dimensional model.

A recently published method (Paul Debevec et al., "Modeling and Rendering Architecture from Photographs: A Hybrid Geometry—and Image-Based Approach", *University of California Berkeley Technical report UCB-CSD-96-893*, January 1996) somewhat simplifies this situation by not having to deal with geometry at a vertex, then edge, then face level, but rather with primitives such as boxes or cylinders. The method requires a user to first create a parameterized (or rough) model of the objects in the scene using a separate editor. Second, the user draws edges on top of one or more photographs. Third, the user marks each edge in each photograph as corresponding to a particular edge in the parameterized model. The method then calculates values for the parameters in the model. This work is based on concepts and mathematics from Camillo Taylor and David Kriegman of Yale University, as reported in "Structure and Motion from Line Segments in Multiple Images", Yale University, Technical Report #94026, January 1994. Although somewhat less labor intensive than previous techniques, the Debevec method (known as Facade) still requires three, individually intensive, steps and the user must be skilled enough to build a parameterized model independent of the photographs.

Other reported methods, e.g., Michael Kass "CONDOR: Constraint-Based Dataflow", *SIGGRAPH '92*, pp. 321–330 (Jul. 26–31, 1992) and Michael Gleicher and Andrew Witkin, "Through-the-Lens Camera Control", *SIGGRAPH '92*, pp. 331–340 (Jul. 26–31, 1992), use data structures known as a dataflow network to create a required Jacobian matrix for providing iterative solutions to the modeling problem. For example, Gleicher and Witkin show how to apply traditional keyframing techniques to existing three-dimensional models and how to then solve for camera positions. However, in this technique, no modeling is done on top of an image nor is any texture extraction provided.

In light of the need for computer-generated three-dimensional models, but given the shortcoming of these and other prior schemes, it would be desirable to have an improved computer-assisted technique for constructing a three-dimensional model on top of one or more images such that the model's parameters automatically match those of the real world object depicted in the photograph(s).

SUMMARY AND OBJECTIVES OF THE INVENTION

Thus, one object of the present invention is to provide an improved computer-assisted technique for constructing a three-dimensional model on top of one or more images (e.g., photographs) such that the model's parameters automatically match those of the real world object depicted in the photograph(s).

A further object of the present invention is to provide an improved technique for determining, from each of one or more photographs, the camera parameters such as focal length, position, and orientation in space such that the projection of a three-dimensional model through the calculated camera parameters matches the projection of the real world object through the camera onto the surface of the one or more photographs.

A still further objective of the present invention is to provide an improved technique for geometric modeling in terms of primitives, such as boxes or pyramids, rather than vertices, edges or faces which reduces the amount of locational and/or associational data a user needs to provide. In effect, the improved technique requires only a single step, rather than separate and multiple modeling and associational steps as required in schemes of the past, to construct three-dimensional models from one or more photographs.

Another objective of the present invention is to provide an improved (over schemes of the past) technique for intuitively manipulating primitives which are used to construct three-dimensional models on a video display or other display screen of a computer system with two-dimensional input controllers (e.g., a mouse, joystick) such that the displayed three-dimensional object manipulation emulates physical three-dimensional object manipulation.

A still further objective of the present invention is to provide an improved technique for incrementally updating the parameters and to provide visual feedback of the updated parameters of a three-dimensional model to a user, making it readily apparent which user action was responsible for any failure to provide a modeling solution and, thus, allowing for rapid reversal and correction thereof.

Yet another objective of the present invention is to provide an improved technique for automatically extracting surface properties (i.e., textures), such as color, from a source photograph for use in a three-dimensional model of a scene produced therefrom and to combine such properties so that partial occlusions are successively eliminated from the model.

These, and other features and advantages are provided by a computer-assisted method which, in one embodiment, allows for manipulating a multitude of objects displayed in a three-dimensional representation on a computer controlled display system having a computer and a display coupled to the computer, the method comprising the steps of displaying one or more digital representations of photographs, selecting one of the representations of the photographs, creating three-dimensional primitives from a variety of available primitives, providing a user actuated input controller for selectively positioning a reference indicator over the displayed projection of the primitive and signaling the computer to activate a constraint placement mode, optionally providing a visual feedback of the constraint placement mode, signaling the computer to create the constraint, and incrementally calculating primitive and camera parameters based on the new constraint, providing immediate visual feedback as the parameters are updated in accordance with the new constraint, repositioning the reference indicator to define a movement of the constraint and providing immediate visual feedback as the constraint is moved and the parameters are updated in accordance with the new constraint location.

In a further embodiment of the present invention, a parameterized three-dimensional model may be constructed on top of one or more digital images, the parameters of the three-dimensional model corresponding to parameters of real-world objects depicted in the one or more images. The one or more digital images may be derived from one or more photographs, for example, digital photographs or scanned representations of photographs. In general, the three-dimensional model includes one or more geometric primitives, for example, boxes or pyramids. The geometric primitives may be textured, with surface properties therefor being extracted from the digital images.

In yet another embodiment of the present invention, a computer-based model, having one or more virtual cameras with parameters determined from a digital representation of one or more images derived from one or more real-world cameras is provided. A projection of the computer-based model through the parameters of the one or more virtual cameras approximates the projection of one or more real-world objects depicted in the digital representations of the one or more images as seen through the one or more real-world cameras. The parameters of the one or more virtual cameras may include focal length, position, or orientation in space.

A further embodiment of the present invention provides a computer-based model which includes a representation of a three-dimensional geometric primitive overlaid on a digital representation of an image having an object shown therein. The primitive is constrained to at least one feature of the object shown within the digital representation of the image and the digital representation of the image may be derived from a photograph. In general, the three-dimensional geometric primitive may be chosen from a variety of available primitives and the digital representation of the image selected from a plurality of available images. Preferably, visual feedback of the constrained representation of the three-dimensional geometric primitive is provided to a user and updated sufficiently to provide the user with immediate feedback regarding changes and/or additions of constraints.

In another embodiment, the present invention includes a computer-based model which includes a parametric scene having estimated parameters and being interactively and incrementally created directly on top of a displayed digital representation of an image. The parametric scene may include one or more three-dimensional, parameterized geometric primitives and a parameterized virtual camera with the geometric primitives constrained to correspond to one or more objects depicted in the digital representation of the image. Preferably, the digital representation of the image is continuously displayed as representations (e.g., wireframes) of the one or more geometric primitives that are superimposed thereon.

The primitives may be simple primitives, such as boxes, pyramids, cylinders, linear extrusions, or rotation symmetric objects; compound primitives; or imported primitives and are constrained using one or more vertex constraints, edge constraints, glue constraints, measurement constraints, on-face constraints, on-top constraints, align orientation constraints, linear align constraints, equidistant constraints, or shared parameter constraints. The glue constraints may be point-to-point constraints, point-to-edge constraints, or edge-to-edge constraints. The measurement constraints may be length constraints, direction constraints, or datum constraints.

Other objects, features, and advantages of the present invention will be apparent from the accompanying drawings and the detailed description which follows.

BRIEF DESCRIPTION OF THE DRAWINGS

The present invention is illustrated by way of example and not limitation in the figures of the accompanying drawings in which.

DETAILED DESCRIPTION

Described herein is a computer-assisted technique for constructing a three-dimensional model on top of one or more images such that the model's parameters automatically match those of real world object depicted in the images. The present invention generally involves loading digital images acquired from scanners or digital cameras and the manipulation of computer displayed objects represented in three-dimensional form, and so it may be helpful to provide a brief description of the relevant components of such a computing environment.

Figure 1:
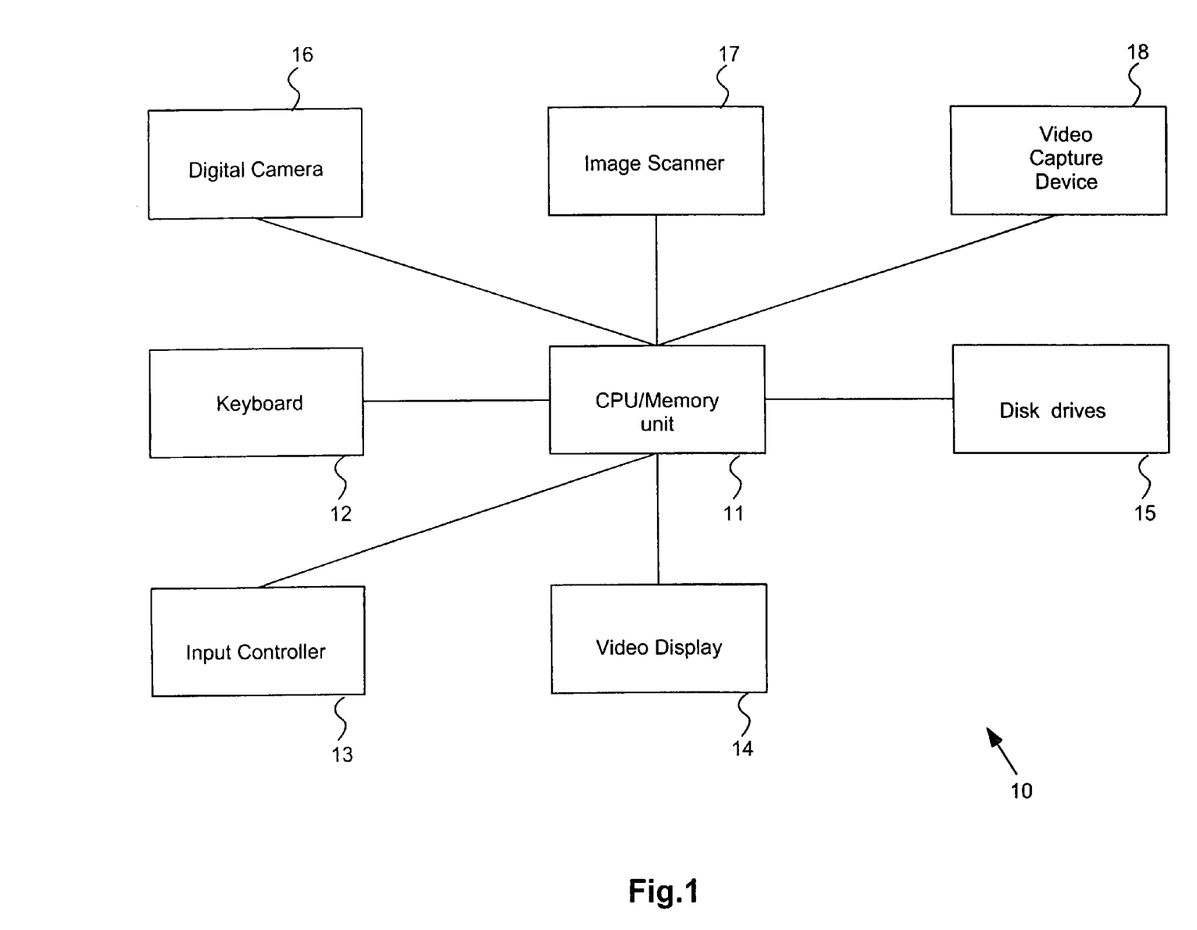
FIG. 1 depicts a generalized block diagram of a computer system as might be used by the present invention.

FIG. 1 is a generalized block diagram of a computer system 10 which includes a central processing unit (CPU) 11. CPU 11 generally includes one or more general purpose processors and one or more memory units, usually in the form of read/write memory (RAM) and/or read only memory (ROM). Application programs, such as may comprise one embodiment of the present invention, may be loaded into RAM (e.g., from another storage medium) for execution by one or more of the general purpose processors which comprises CPU 11. In other cases, computer readable instructions which comprise an embodiment of the present invention may be stored in ROM or other non-volatile media, or downloaded from a source of such instructions (e.g., via a computer network and/or the network of networks commonly referred to as the Internet) for execution by CPU 11.

Computer system 10 also includes a keyboard or other alphanumeric input device 12 which is coupled to (e.g., via one or more busses) and provides user input to CPU 11 as does a two-dimensional input controller 13. Two-dimensional input controller 13 may, by way of example, be a mouse, trackball, stylus or other input device. Images may be provided to CPU 11 via image scanning device 17, video capture device 18 (e.g., which is able to extract still images from a video signal) and/or digital camera 16, each or any of which may be coupled to CPU 11 via one or more connectors and/or busses.

Disk drive unit(s) 15 (or other long term storage media) may also be coupled to CPU 11 and may be used for storing the digital images, and geometric and texture data generated by the present invention as well as computer readable instructions which comprise an embodiment of the present invention. Display output is provided by a video display unit 14 coupled to CPU 11. Video display unit 14 may be a conventional display such as a liquid crystal display (LCD) or other display device.

Digital images can be created by scanning existing photographs or printed material into the computer system 10 and storing the same in memory or on disk drive 15. This may be accomplished, for example, using a software application which, when executed by CPU 11, allows still images to be captured from a video (e.g., as a frame of the video) and stored to memory. Alternatively, the output of digital camera 16 or scanner 17 may be downloaded to memory and/or long term storage. In this way, one or more digital images may be stored and later used by a software application which is one embodiment of the present invention.

Figure 2:
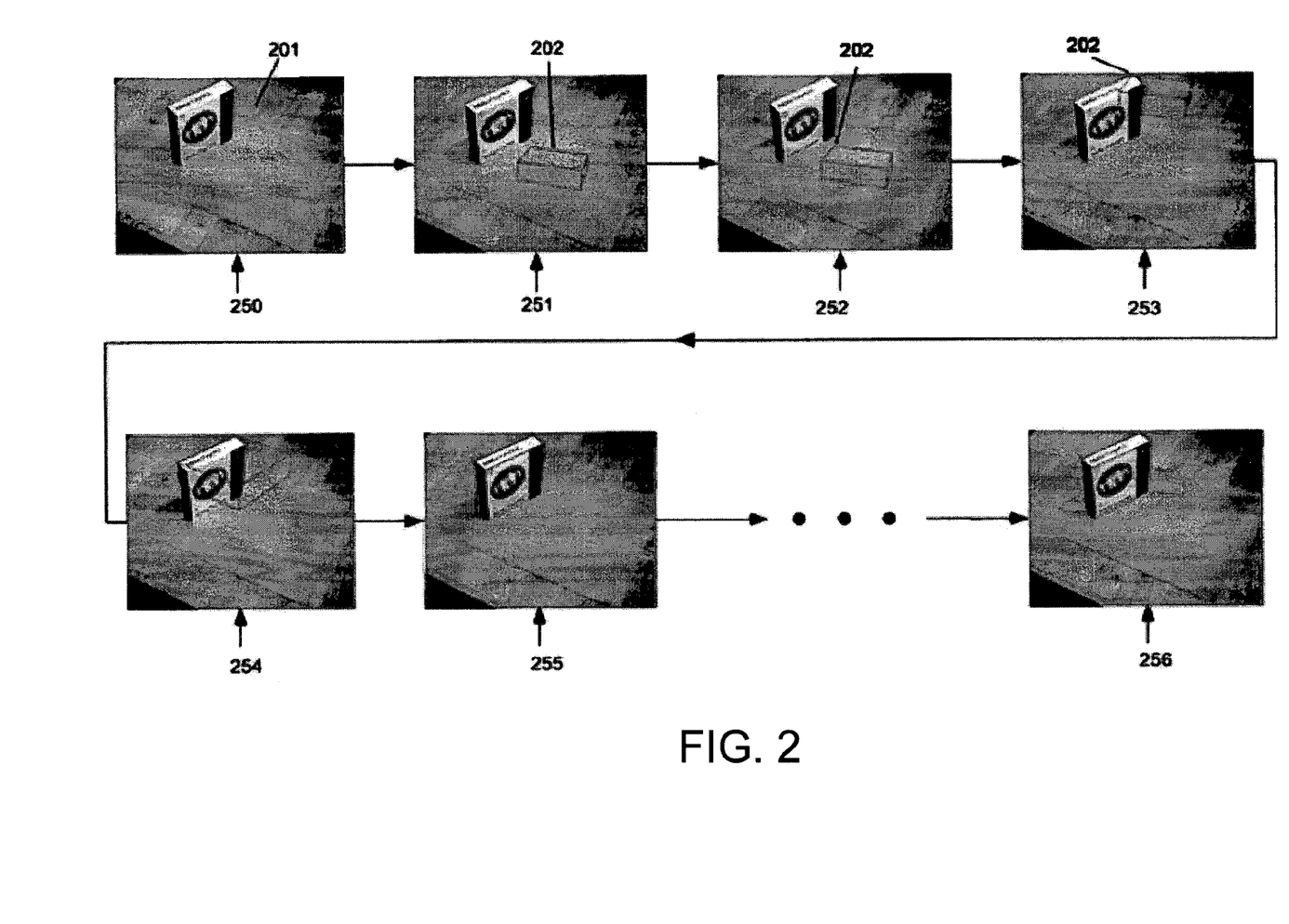
FIG. 2 illustrates the visual feedback provided by the present invention, including a user-supplied image overlaid with a wireframe of a primitive and constraints.

FIG. 2 now illustrates a general method of creating a digital model using the methods of the present invention. Having loaded a digital image 201 (step 250), a user may then create one or more objects known as primitives (e.g., boxes, pyramids, cylinders, or other three-dimensional objects) which approximate the objects shown in the digital images (step 251). A wireframe rendering 202 of the primitives may be displayed over top of the digital image 201 (i.e., the digital representation of the photograph). The objective then, is for the user to manipulate the wireframe primitive rendering 202 using the methods of the present invention, until the wireframe precisely (or nearly precisely) coincides with the object it represents in the digital image (steps 252, 253, 254, 255 and 256). Thus, the user creates a geometric model (from the primitive(s)) right on top of the digital image 201 (i.e., the photograph(s)), without requiring the use of separate editors, windows or views. In the example shown in FIG. 2, a wireframe rendering 202 of a rectilinear box is manipulated until it coincides with the outline of a box shown in the digital image 201.

The two-dimensional wireframe rendering 202 of the primitive may be created from its predefined three-dimensional representation by projecting the geometry of the primitive through a virtual camera. In accordance with the methods of the present invention, parameters for the virtual camera, such as position, orientation, focal length, etc., are found (e.g., as the wireframe primitive representation 202 is aligned with the object it represents in the digital image 201) such that projection through the virtual camera yields the same two-dimensional projected geometry as is visible in the underlaid digital image (i.e., the underlaid photograph) 201. If more than one digital image (photograph) 201 is provided, then multiple virtual cameras (e.g., one for each image) may be created and the corresponding camera parameters estimated therefore. At the same time, parameters for each of the primitives (e.g., length, width, height, orientation, and location in space) overlaid on the digital image are determined.

Figure 7:
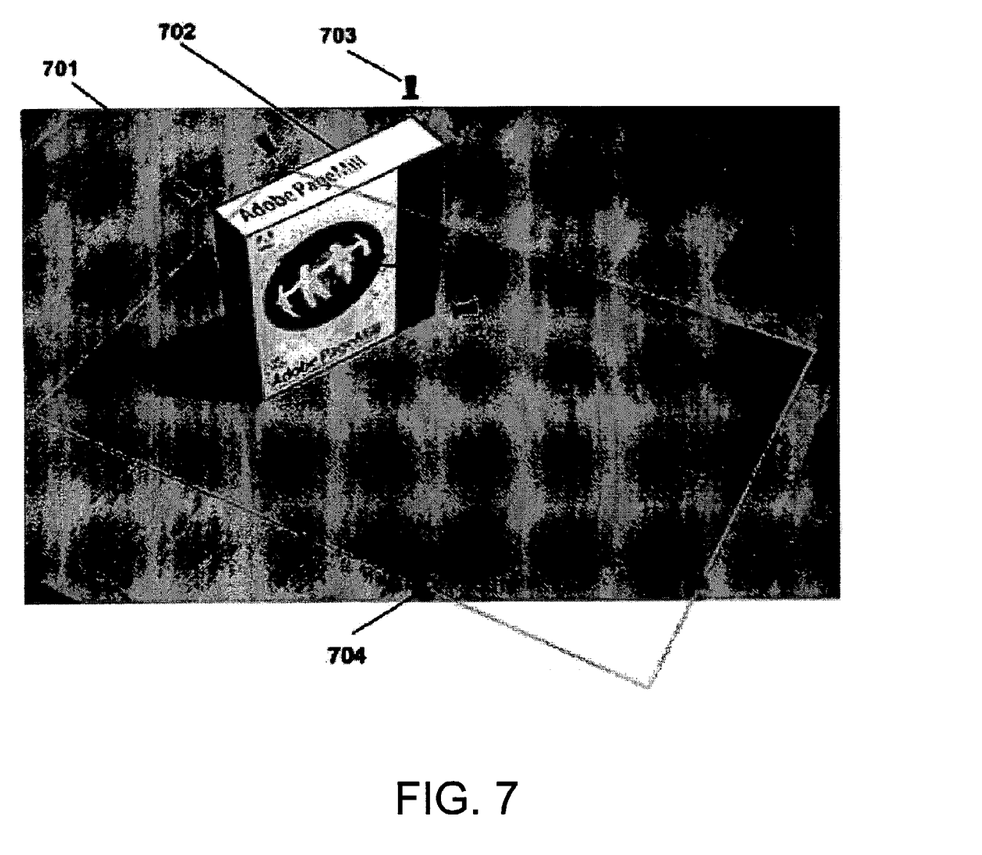
FIG. 7 illustrates the use of constraints to align wireframe representations of primitives to objects in a digital image in accordance with the present invention.

To accomplish these objectives, as the user manipulates the wireframe renderings 202 of the primitives to align the wireframe with the underlaid image 201, constraints are added to "fix" the wireframe 202 to the image 201. For example, as shown in FIG. 7, constraints 703, 704 which constrain or fix the location of corners or edges of the wireframe projections 702 to the locations in the image 701 to which they correspond or to constrain geometrical relationships between the primitives in their three-dimensional representations are added. As the constraints are introduced into the model, new estimates for all parameters of the primitives and virtual camera(s) are calculated. Based on these new parameters, the geometric coordinates of each primitive can be calculated and projected through each virtual camera to yield an updated projected wireframe graphical representation overlaid on the image and displayed to the user. The present invention minimizes the amount of change in parameters which, with frequent enough incremental re-evaluations and reprojections yield a smooth movement of the wireframe, thus providing the user with the illusion of manipulating real three-dimensional objects made of springs or an elastic-like material.

Figure 8:
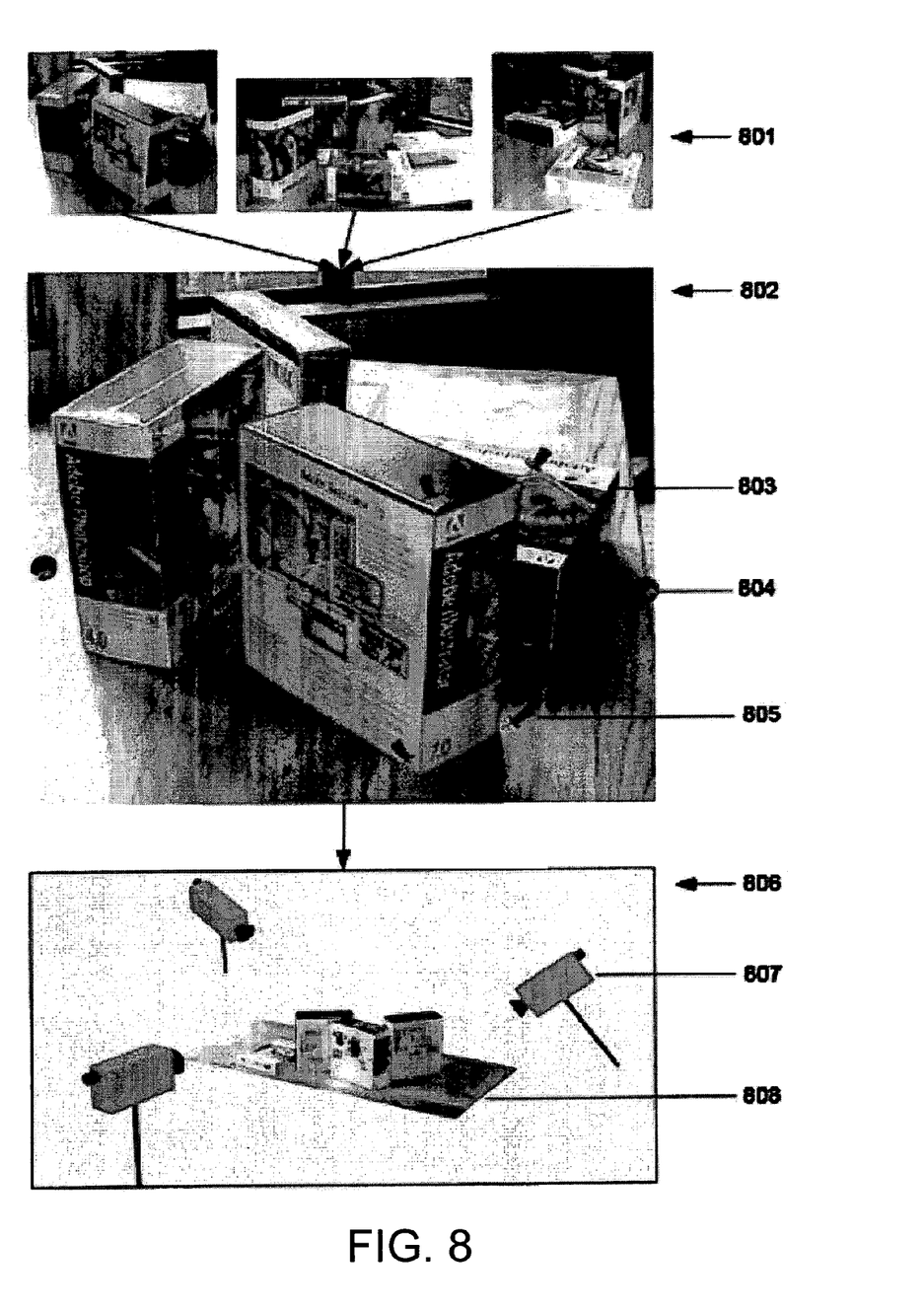
FIG. 8 illustrates the creation of a three-dimensional model representing the scene(s) captured in one or more images in accordance with the present invention.

The concept of primitives will now be described, and then exemplary ones of the available primitives which may be used by the methods of the present invention will be discussed. Following these descriptions, a discussion of exemplary constraint types and modes by which constraints may be generated is presented. The mathematical framework necessary to evaluate the parameters of each primitive and the virtual cameras will then be discussed. Throughout these descriptions, however, it will be helpful to keep in mind the overall function of the present invention. In brief, as illustrated in FIG. 8, the goal is to create a three-dimensional model 808 representing the scene(s) captured in one or more images (e.g., photographs) 801. Thus, primitives, which together will form the three-dimensional model, are created (step 802) which correspond to various objects in the scenes. The primitives are created by aligning wireframe representations thereof 803 to the objects in the scenes depicted in the images and then fixing the geometrical and other parameters of the primitives using one or more constraints 804, 805. As the primitives are so created and "constrained", the model 808 which they form (step 806) accurately depicts the scenes from the images. The two-dimensional wireframe renderings of the primitives are created by projecting the geometry of the primitives through virtual cameras 807. Projection through the virtual cameras 807 yields the same two-dimensional projected geometry as is visible in the underlaid digital images 801. Textures may then be overlaid on the surface of the primitives to provide a sense of realism and a user may reorient the model and/or immerse him/herself in it, as though altering or entering the scene depicted in the image.

Figure 3:
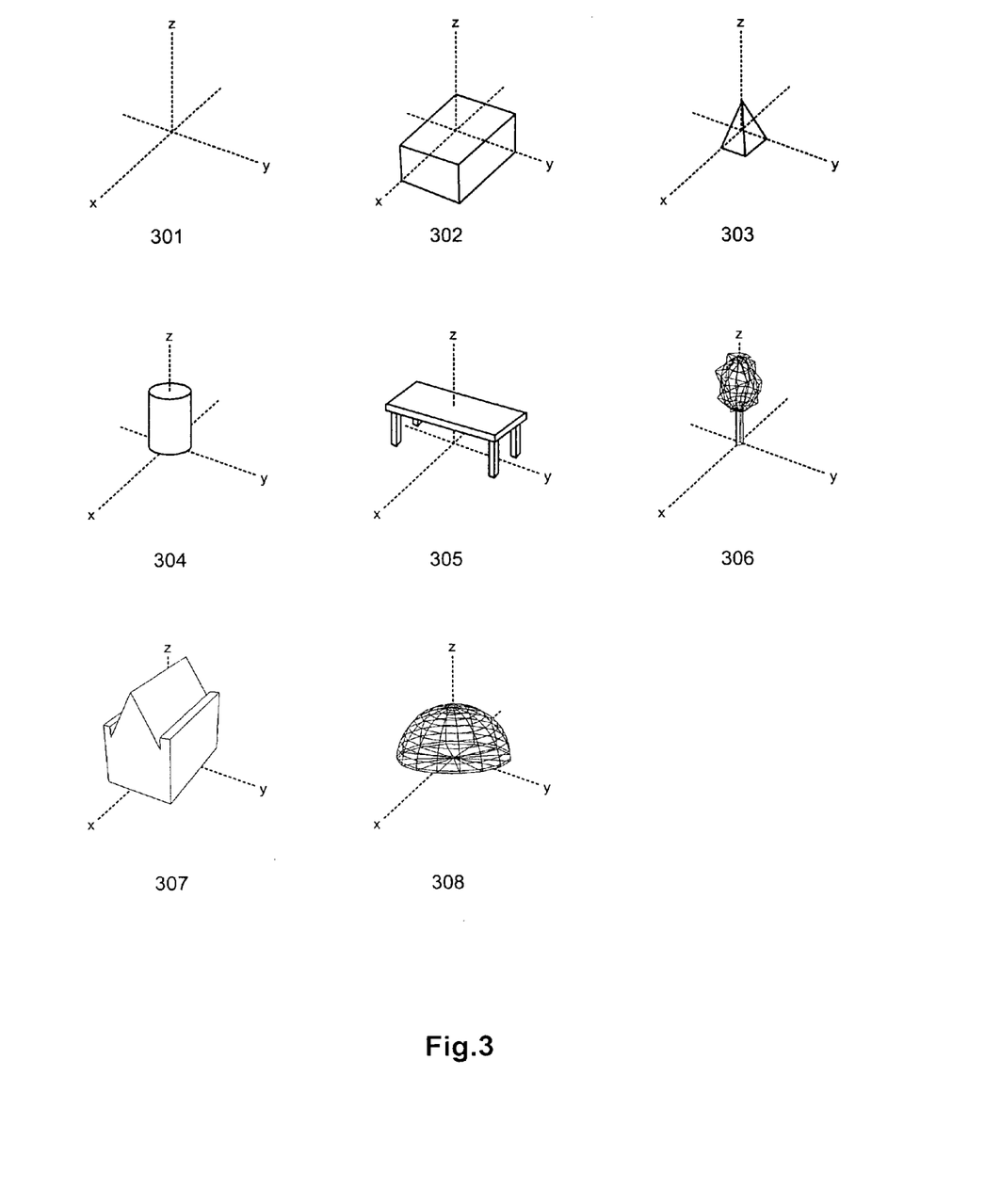
FIG. 3 illustrates a variety of primitives with their local coordinate systems for use with and according to the present invention.

FIG. 3 provides an exemplary illustration of some primitives which may find application with the methods of the present invention. In general, each of the primitives has its own local coordinate system 301 about which the primitive is defined. For example, a box primitive 302 may have length, width, and height parameters defined in a local x, y, z coordinate system, thus defining the dimensions of the box. Other primitives have similar parameters and may have fewer or more parameters depending on their three-dimensional shape and the parameters needed to define that shape in the local coordinate system 301. For all the primitives, the local coordinate system 301 is placed in a world coordinate system (e.g., defining the scene depicted in an image) at a defined location in the world coordinate system. The location in the world coordinate system is defined by three coordinates and the local coordinate system 301 may be placed at different orientations in the world coordinate system. This orientation may be specified using three angles or a quaternion. Such use of local and world coordinate systems to define computer-generated graphical representations is well known to those of ordinary skill in the art.

Each primitive is paramerterized. That is, each primitive's geometric coordinates are derived from a few parameters. It is these parameters which are evaluated by the present invention as the wireframe representations of the primitives are manipulated to correspond to the objects in the scene which the user desires to model. The precise interactive behavior of a primitive under the mathematical regime of the present invention depends upon the parameterization, in particular the unit sizes used. More generally, the calculations used attempt to find the smallest parametric change in order to satisfy a given set of constraints and therefore are sensitive to the amount by which a change in parameters affects a change in three-dimensional coordinates of a primitive.

The first group of primitives used in one embodiment of the present invention are referred to as "simple" primitives. These are the rectilinear box primitive 302, which has parameters length, width, and height; a pyramid primitive 303, which is a four-sided regular pyramid with parameters length, width, and height; and a cylinder primitive 304, which has parameters radius and height. These three primitives allow a surprising range of interior and/or exterior architectural scenes and other scenes, and objects to be modeled with the present invention. Of course, this set of simple primitives could be expanded by a practitioner of ordinary skill in the art, for example, to adapt the present invention to suit a particular need or industry. For example, the set of simple primitives could be expanded to include a sphere (e.g., with a radius or diameter parameter), a cone (with parameters radii and height) and/or an egg-shaped primitive (with appropriate parameters such as radius of curvature, length and height) for applications where such shapes may find particular and/or repetitive use.

The next group of primitives are more generalized versions of the simple primitives. They are available because they offer more flexibility in modeling scenes with complex shapes but also require more user specification. The first of these is the translation sweep primitive. This is a two-dimensional contour extruded along a linear path perpendicular to the plane in which the contour is defined. In the present context, translation sweep primitives are useful for modeling flat house facades, staircases, doorways, arches and a wide variety of other common shapes. The parameters for the translation sweep are the length of the extrusion, and for each of the points in the contour, an x and y coordinate. The second more general primitive is the rotation sweep, or lathe 308 where a flat contour is swept around an axis in three dimensions. A large number of rotation symmetric objects such as domes, columns, bottles, cones, and cylinders can be modeled in this way. The parameters for the rotation sweep are the radius and height coordinates of each contour point. The contour is swept around the local coordinate system's z-axis.

The next group of primitives are the compound primitives. These consist of multiple simple primitives that are tied together geometrically by shared parameters. The table primitive 305, for example, consists of a box primitive for the table leaf and four (optionally) identically dimensioned box primitives for the legs, attached beneath the leaf. The parameters for the table primitive are table leaf length, width, and height and leg width, height, and offset (in x and y from the center of the table). In one embodiment, the leg width and offset is the same for all of the table's legs. In one implementation, all legs have a square cross-section, however, other cross-sections, such as cylindrical or a combination of cylindrical and square (in order to give a more finished look to the table) may be used. Thus, six dimensional parameters, in addition to the three location and three orientation parameters, fully parameterize the table primitive. Although a specialized primitive, this allows a wide variety of common tables to be modeled very quickly as the inherent symmetries and relationships are already built into the primitive. Thus, users need only enter a small amount of constraint information than would otherwise be necessary using four separate box primitives for legs and a further box primitive for the table leaf. Other specialized compound primitives can also be formulated, for example, hinged lamps (where the angles of the hinges are the parameters) or building primitives 307 could be created. For such compound primitives, more modeling work has essentially been done in advance and the mathematical engine of the current invention merely has to evaluate a few parameters. Such models will often be application domain specific. For example, primitives for interior design, bathrooms, exterior design, classical architectures, office furniture, etc. could be created as one or more libraries of primitives which could be imported as required. This can greatly reduce the amount of information a user need specify in order to determine the necessary parameters.

Another primitive allows the use of an imported geometry from a file generated by an external (e.g., conventional, three dimensional) computer-aided design software application. This imported shape can have any polyhedral geometry 306, for example, a vase. The shape is then essentially fixed, as defined by the file. The present invention then merely estimates a single uniform scaling parameter. in cases where a geometry is known and available, this type of primitive allows a user to skip any modeling steps at all—the present invention need only be used to find the location, orientation, and size of the positioned imported primitive in the scene.

After creating primitives, or in some cases while creating them, the user can apply and manipulate a variety of constraints upon them to force the primitives to coincide with the objects represented thereby in the underlaid image. Exemplary constraints for use according to the methods of the present invention are now discussed with reference to FIGS. 5 and 6.

Figure 5:
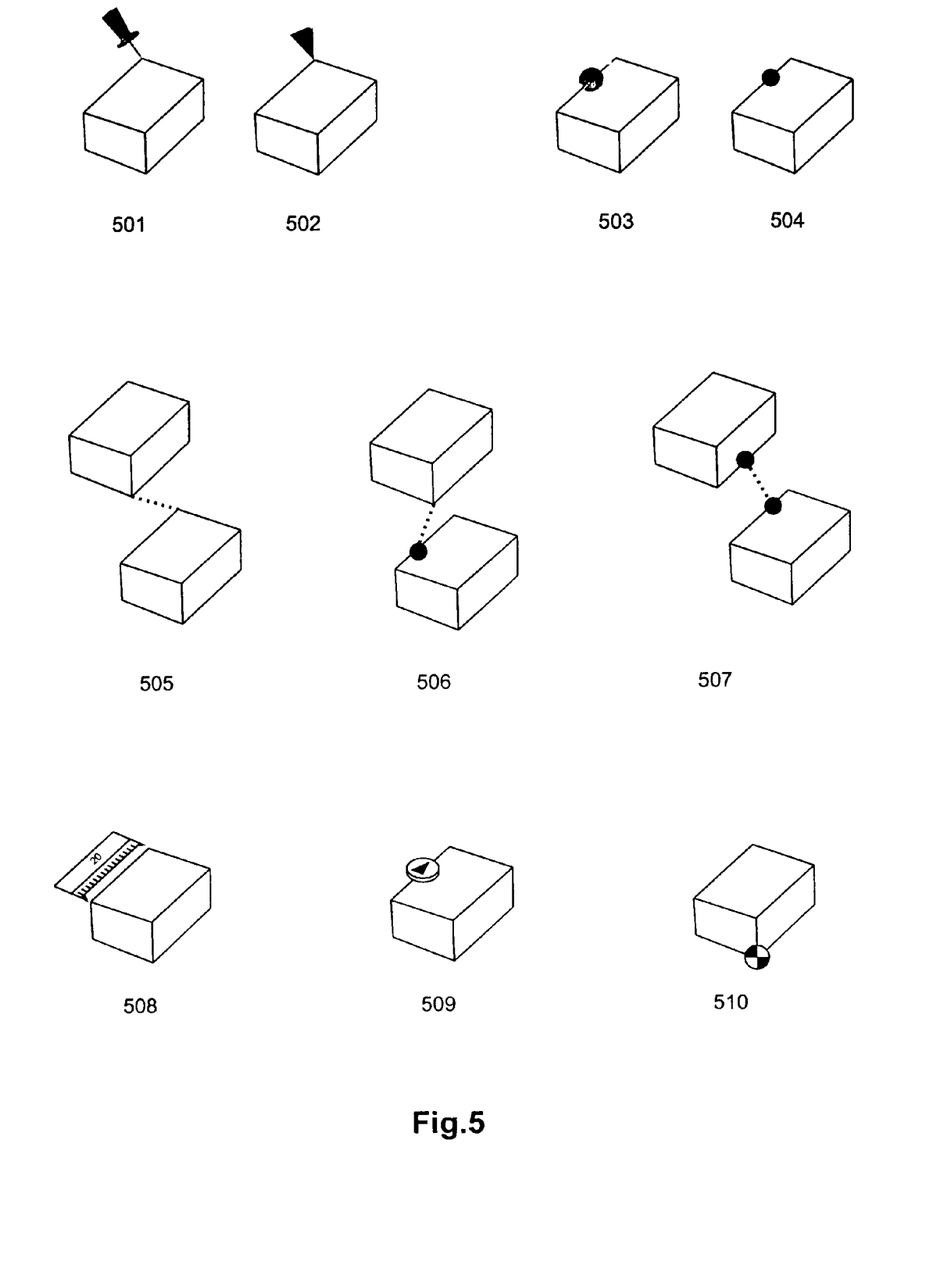
FIG. 5 illustrates a variety of constraint types and their visual feedback provided according to various embodiments of the present invention.

First referring to FIG. 5, an example of a constraint which may be used to "fix" a primitive to an object in an image is a pin constraint. The pin constraint intuitively corresponds to a push pin which may be used to affix notes or other items to a cork board, e.g., on a refrigerator, or at a desk or other workspace. As visual feedback, it may be rendered realistically (501) or abstractly (502). To a user, when a pin constraint is used, it appears that a corner of a projected wireframe is pinned to the underlaid image at a particular location determined by the user and defined by the location of the pin. Mathematically, this states that the distance between the pin constraint's location and the projection of the corner of the wireframe should be zero.

Another example is a bead constraint which intuitively corresponds to a bead which is threaded along one of the edges of the projected wireframe, where the bead is used affixed to the underlaid image at a particular location determined by the user but is free to rotate. As visual feedback, it may be rendered realistically (503) or abstractly (504). The edge of the wireframe can slide freely through the bead at any arbitrary angle, but the edge is constrained to always pass through the bead. Edges can be straight lines, circles, ellipses or other curves. Mathematically, the bead constraint states that the distance between the bead location in two dimensions and the nearest point in two dimensions on the projected edge which passes through the bead should be zero.

An example of a constraint between two primitives is the point-to-point glue constraint 505. The user indicates, on the two-dimensional projected wireframes, one corner on each of two primitives and places such a constraint, in effect stating that these points should coincide in three-dimensional space. That is, the points should have the same x, y and z coordinates.

Another example of a constraint between two primitives is the point-to-edge glue constraint 506. The user indicates, on the two-dimensional projected wireframes, one point of one primitive and an edge of another primitive, and places such a constraint, in effect stating that the vertex of one primitive should lie along the edge of the other primitive.

A further example of a constraint between two primitives is the edge-to-edge glue constraint 507. The user indicates, on the two-dimensional projected wireframes, one edge of one primitive and an edge of another primitive, and places such a constraint, in effect stating that the three-dimensional edges are collinear.

An example of a constraint between two points on one or two primitives is the ruler constraint 508. The user indicates, on the two-dimensional projected wireframe(s), one corner of a primitive and either another corner thereof or a corner of another primitive and places the constraint. In effect, this states that the three-dimensional distance between the two points should equal the defined ruler distance.

An example of a constraint on a whole primitive, or on one face of it, is the compass constraint 509. The user indicates the primitive or a face thereof and places the compass constraint, in effect stating that the primitive's coordinate system orientation or the orientation of the face should be in the defined direction of the compass constraint. The compass can have up to three defined directions, for example specified as Euler angles or a single quaternion.

Yet another example of a constraint is the datum constraint 510. The user indicates, on the two-dimensional wireframe projection, a corner of a primitive and places such a constraint, in effect stating that the location corresponding to the three-dimensional coordinates of the corner should equal the defined three-dimensional location of the datum constraint.

Figure 6:
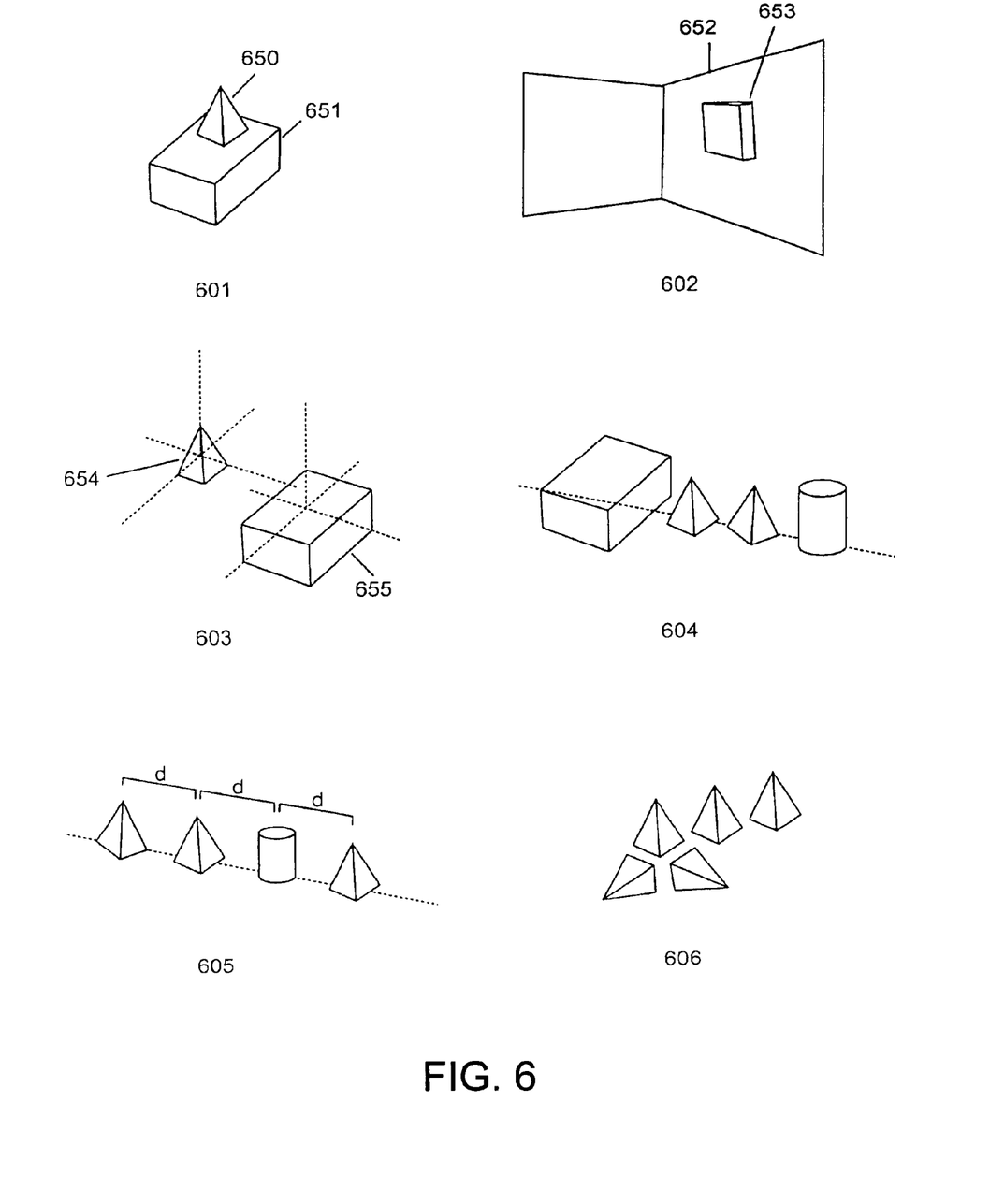
FIG. 6 illustrates further constraint types and their visual feedback provided in accordance with yet further embodiments of the present invention.

Now referring to FIG. 6, another example of a constraint between two primitives is the on-top constraint 601. The user indicates one primitive 651, which is to be the base, and another primitive 650, which is constrained to be on-top of the base primitive 651. Placing the constraint in effect states that the z-location of the on-top primitive 650 should be equal to the highest z-coordinate of the base primitive 651.

Yet another example of a constraint between two primitives is the on-face constraint 602 which is a generalization of the on-top constraint 601. The user indicates a face of one primitive 652 which is to be a "base" and a face of another primitive 653 which is constrained to remain perpendicular to the specified face of the base primitive. Placing the constraint in effect states that the z-coordinate axis of the on-face primitive 653 should be perpendicular to the specified face of the base primitive 652.

An example of a constraint between two or more primitives is the align orientation constraint 603. The user selects two or more primitives 654, 655 and places the constraint, in effect stating that their coordinate systems should have the same orientation. Note that this is different from the compass constraint 509, which determines the absolute orientation of a coordinate system. The align orientation constraint 603 merely requires that rotations between the chosen primitives 654, 655 be the same, but does not constrain what those same values must be.

Another example of a constraint between two or more primitives is the linear alignment constraint 604. The user selects two or more primitives and places the constraint, in effect stating that their coordinate system origins should lie along a line in three-dimensional space.

Yet a further example of a constraint between two or more primitives is the equidistant constraint 605. The user selects two or more primitives and places the constraint, in effect stating that their coordinate system origins should be at equal distances (d) from one another in three-dimensional space.

A still further example of a constraint between two or more primitives is the shared parameters or duplicate constraint 606. This has the effect of making the dimensions, such as length, width, height, etc., of two primitives (which must be of the same type) equal. Their locations and orientations are still free to take on any arbitrary value.

Some constraints are used more frequently than others. The present invention offers different mechanisms for creating different types of constraints thus making frequently used constraints very easy to create, while still allowing the remaining wide variety of constraints to be created without always forcing a complex user interaction or complex visual display. Typically, for the digital models to be created according to the methods of the present invention, objects will sit on a flat ground plane, on top of each other, or attached to faces of each other. Thus, preferably, new primitives are created on the ground plane, at z=0, in effect constraining the z-coordinate of the primitives' coordinate system's origin to be zero, and with the z-axis perpendicular to the ground plane, in effect applying a compass constraint (with angles equal to zero degrees) to two of their coordinate axes, but leaving rotation around their z-axis enabled.

Pin and bead constraints are the most basic and are expected to be the most frequently user-applied constraints. In one embodiment, as the user manipulates the two-dimensional pointer to be approximately above a point or edge of a projected wireframe, a visual indication will be drawn. This graphical feedback tells the user what type of constraint would be created and at what location it would be created if the user actuated the two-dimensional controller (e.g., by clicking a mouse button). Thus, as shown in FIG. 7 for example, pins would appear at the corners of the projected wireframes and beads would slide along the edges thereof as the pointer moves in close proximity to either. In addition, if there are any existing constraints in proximity to the pointer, they will temporarily be drawn differently (e.g., by changing color) indicating that upon activating the two-dimensional controller or other input device, the existing constraint would be moved or otherwise selected, rather than a new one placed.

Activating the two-dimensional controller or other pointing device (e.g., by pressing a mouse button) activates a mode where the appropriate constraint is first created and then moved to coincide with the current location of the pointer, updating its location as the pointer position changes in response to user input, and reevaluating the model parameters and redrawing the wireframes corresponding to the new model parameters. This mode continues until the two-dimensional controller is deactivated (e.g., by releasing the mouse button).

Glue constraints, although less commonly used than pin or bead constraints, still need to be accessible quickly. In one embodiment, a user may activate (e.g., by pressing a designated key or keys on a keyboard or other input device while moving the cursor over a corner or edge of a projected wireframe of a primitive) a glue constraint creation mode using relatively few keystrokes and/or cursor manipulations. For example, the glue constraint creation mode may be activated in response to a user holding down a modifier key (e.g., the control key) of a keyboard while activating the two dimensional controller (e.g., by pressing a mouse button) while the pointer or cursor is over an edge or corner of a projected wireframe. In the case where the pointer is over a corner of a projected wireframe when the glue constraint creation mode is entered, either a point-to-point or point-to-edge glue constraint will be created. Which one will depend on the user's next actions. As the user manipulates the pointer to move over other primitives' corners or edges, feedback graphics (e.g., a prompt displayed on the screen) again indicate the type of constraint that would be created if the user releases the mouse button. For example, when the pointer is in proximity to a corner of another primitive, the graphical feedback indication will show the creation of a point-to-point glue constraint. If the pointer is in proximity to an edge of a primitive, the graphical feedback will indicate creation of a point-to-edge glue constraint. When the mouse button is released in either situation, the appropriate glue constraint is created and new parameters are evaluated which try to satisfy the new constraint while maintaining all existing ones.

To add shared parameter constraints, the user selects an existing primitive and executes a duplicate command. This will not only create another primitive of the same type, but also share the dimensional parameters of the original and duplicate primitives, thus ensuring that they have the same shape and size, although the duplicate primitive is still free to change its origin and orientation. The method also ensures that the duplicate and the original are always of the same type, a prerequisite for the shared parameter constraint.

For the less frequently used constraints, such as the on-top, align orientation, linear alignment and equidistant constraints, one embodiment of the present invention uses the same mechanism. The user first selects an existing primitive and then executes a command (e.g., using one or more keystrokes) which combines the desired constraint with the desired new primitive shape. For example, "on-top create a box" or "create an orientation aligned cylinder". Of course, one of ordinary skill in the art will appreciate that alternative means of creating constraints or different combinations of using location sensitive feedforward and creation modes, menu commands, button commands, keystrokes, etc. are well within the scope and spirit of the present invention and the above examples are merely illustrative and not limiting.

As indicated above, one objective of the present invention is to provide an improved technique for manipulating primitives on the screen in response to a two-dimensional input controller motion which specifies constraint location movement. This is accomplished by continuously evaluating updated estimates of the primitive and camera parameters and redrawing the scene displayed according to the updated parameters.

In simpler applications, such as editing the endpoint of a two-dimensional line in a drawing program, this can be accomplished by simply setting the endpoint currently being edited to the value of the two-dimensional input controller as it is manipulated by the user. However, in the context of the current invention, a more sophisticated scheme is required, in part because the entities being manipulated are not typically independent parameters which can be set. For example, when editing a constraint on a corner point of a box primitive, one cannot simply set the value of the corner point to the value of the current two-dimensional input controller. For one, the corner point is defined in three-dimensions and thus requires a three-dimensional value, not just a two-dimensional value. But even if a three-dimensional value were available, one could not set the three-dimensional point. That is, because the two-dimensional corner points of the box primitive—and all other geometries for all primitives for that matter—is a function of the primitive's independent parameters such as length, width, height, location and orientation as well as the current virtual camera's parameters. Thus, the relevant parameters have to be changed to effect the desired motion, and mathematically this is a much harder problem to solve than the simple endpoint of the two-dimensional line.

Figure 4:
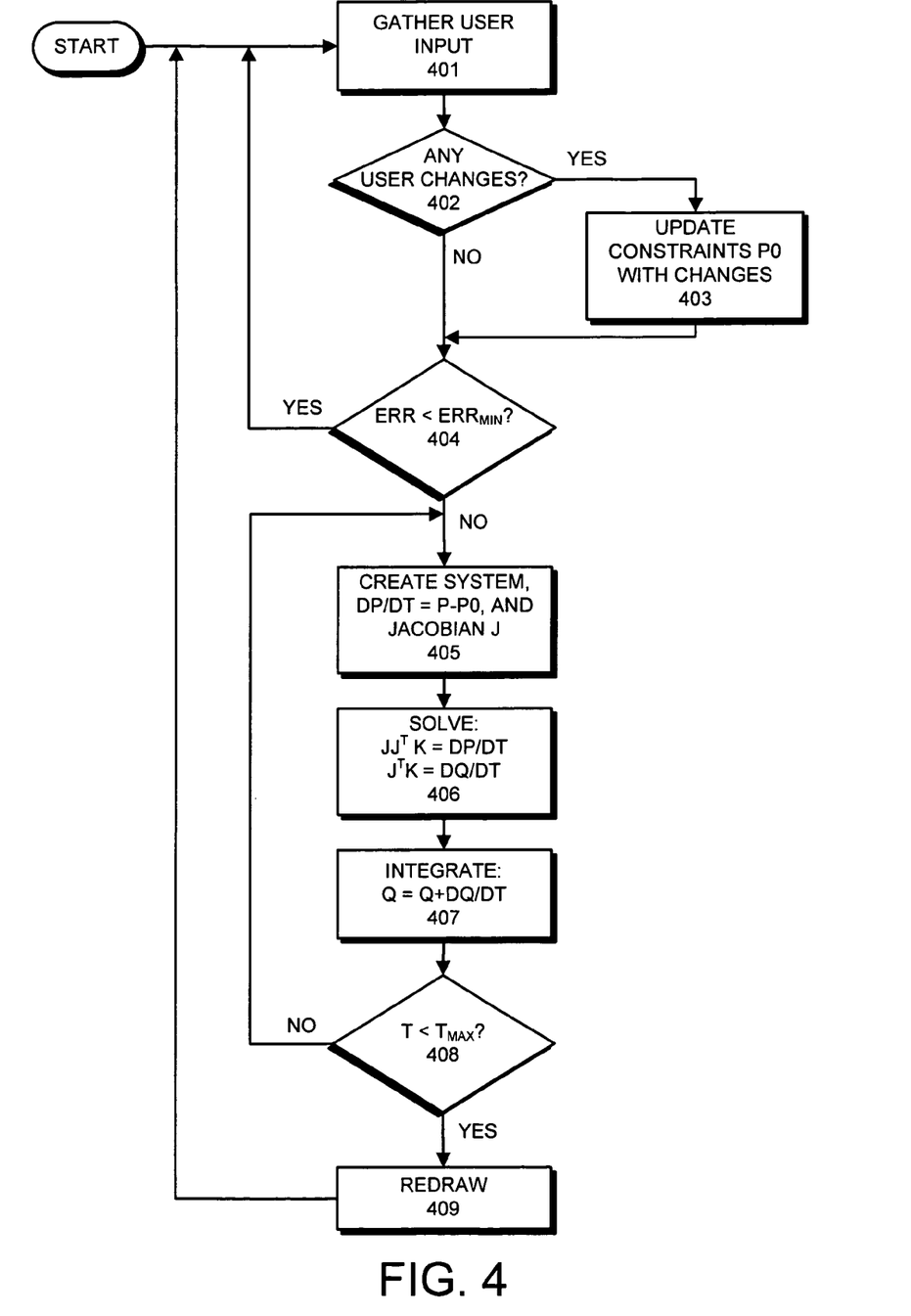
FIG. 4 is a flowchart illustrating the sequence of steps involved in creating a three-dimensional model according to one embodiment of the present invention.

To illustrate the solution embodied in the present invention consider the flow diagram of FIG. 4 and call the vector of the relevant parameter, including the primitive and virtual camera parameters, "q". Call the set of two-dimensional points necessary to display a wireframe representation of the primitive on the display "p". Then, p is a function of q, or:

$$p=f(q). \qquad (1)$$

It is mathematically impractical to solve equation (1) for q given a set of desired constraint locations. Instead, the problem is solved by specifying dp/dt=p−p0, where p0 are the constraints, as a distance of actual (projected) and displayed (constrained) two-dimensional locations, calculating dq/dt, and integrating that quantity continuously, yielding values for parameters q that can be used to update the screen display.

As is known to those of ordinary skill in the art, for a vector of constraint locations, the quantity df/dq is a derivative matrix called the Jacobian, usually denoted by "J". Like p, this matrix is a function of the parameters q. J can be calculated from knowledge of current parameter values q and the function f which is typically a combination of several functions, such as local-to-global coordinate transformations, camera coordinate transformations, perspective divisions, and screen coordinate transformations. Rather than calculating the compound derivative (which can be quite complex), the chain rule can be employed:

$$J = df(g^1(q), g^2(q), \ldots)/dq$$

$$= df(g^1(q))/dg^1 * dg^1(q)/dq + df(g^2(q))/dg^2 * dg^2/dq^+ \ldots ; \qquad (2)$$

where $dg^1(q)/dq$ etc. may also be expanded if necessary

There may be many possible values of q which satisfy the relationship of equation (2). The present invention chooses a technique which evaluates the smallest value, i.e., the minimum change required to update the parameter values. In an interactive, incrementally updated feedback loop to the user, this is important as the display will not make sudden, unexpected jumps which might otherwise be encountered if other update schemes were employed. Therefore, a least squares formulation is used, and the problem becomes:

$$\text{minimize}(E) = 0.5 * dq/dt \cdot dq/dt \text{ subject to } dp/dt = J * dq/dt \quad (3)$$

where, . indicates the dot product, and

E is an error function, sometimes called an energy function.

Using a technique known in the art as Lagrange multipliers, one solves the linear system:

$$dp/dt = J \cdot J^T k \quad (4)$$

where, k is an intermediate result called the Lagrange multiplier, and then evaluates:

$$dq/dt = J^T k \quad (5)$$

which yields one desired result dq/dt for one timestep. Equations (4) and (5) are now used repeatedly to evaluate dq/dt for each timestep and to integrate q over time, for example using well known Euler or Runge Kutta methods. This yields an updated parameter vector q and, periodically, this q is used to redraw the wireframe representation to provide the user with visual feedback.

Thus, with reference to FIG. 4, at step 401 user input regarding the addition of constraints is gathered and used to determine (step 402) whether any changes have been implemented. If so, then at step 403, the constraints p0 are updated with those changes. To ensure frequent enough user feedback, the current state of q may be redrawn whenever a predetermined time period has expired (see step 409, below). Then, at step 404, the present invention seeks to minimize the error or energy according to the above procedures.

When a minimum error (or energy) state has been achieved, the Jacobian matrix is created (step 405) and solutions for dp/dt and dq/dt are obtained (step 406). Next, the quantity q is integrated over time (step 407) and, periodically (step 408) an updated parameter vector q is used to redraw (step 409) the wireframe representation to provide the user with visual feedback.

In the present invention, virtual camera and primitive parameters are estimated simultaneously, eliminating the need for a separate camera calibration and estimation step before object measurement can begin. An important aspect of this invention is that even at the point of creation of the first primitive, and at all times thereafter, a current estimate for all the camera and object parameters exists. As the user provides additional information in the form of constraints or additional images, these parameters get updated and more precise, but they are always available. Initially, the parameters are set to a default value, but typically converge to "correct" values after only very little additional user input (e.g., as the projected wireframes are manipulated to correspond to the objects depicted in the underlaid digital image).

The fact that the parameters are always available and are updated incrementally makes it possible to continuously generate an updated wireframe rendering of one or more primitives in response to changing parameters such as camera position. In this way, the user can see the effect of the current parameters and can add new information in the form of constraints where necessary. Including the user in the update loop by providing visual feedback as parameters are updated is significantly different from existing modeling approaches which require that a user enter a great deal of data and then run in a batch mode which may or may not provide a correct solution, e.g., if insufficient or incorrect data was entered. With the methods of the present invention, if insufficient input information has been provided, this fact is readily apparent to the user because the projected wireframes do not (yet) match up with the objects in the underlaid image. To remedy the situation, the user need only add constraints until a sufficient match between the wireframes and the objects in the underlaid image has been achieved. In fact, rather than merely adding arbitrary constraints, users are provided with the kind of visual feedback which allows them to intuitively constrain primitives where needed, e.g., where the projected wireframes are "most wrong" with respect to the underlaid image. These tend to be the most effective (from a mathematical sense) constraints for adapting the model to the image. In the past, modeling schemes generally provided little or no information regarding which constraints were required or how important some constraints were to others. The present scheme, however, immediately provides the user with an indication of how much and what information is required and does so in a highly intuitive fashion.

Also, the incremental approach used in the present invention allows immediate detection and reversal (e.g., via an undo facility as has become common among user applications) of inconsistent user input. Usually, the inputs will be consistent and the parameters will provide a reasonable match to the objects in the image. As an inconsistent input (e.g., in the form of a constraint) is provided by a user, the parameters will diverge, rather than converge to the correct value, and thus the projected wireframe will look less correct or more misshapen than before. In such a case (and as will be readily apparent thanks to the immediate visual feedback provided to the user), the user can simply "undo" the last input and restore the set of inputs to the previous, consistent state. Of course, to accommodate this undo option, one or more previous states will have to be maintained, e.g., in memory.

Thus, an improved computer-assisted technique for constructing a three-dimensional model on top of one or more images such that the model's parameters automatically match those of the real world object depicted in the images has been described. Although the foregoing description was set forth with reference to certain illustrated embodiments, it should be appreciated that the present invention is in no way limited to these examples. Instead, the invention should only be measured in terms of the claims which follow.

What is claimed is:

1. A computer-assisted method, comprising:
constructing a three-dimensional model on top of one or more digital images through direct manipulation via a cursor-control device of one or more renderings of predefined geometric primitives selected to approximate items depicted in the one or more digital images and which (i) collectively make up the three-dimensional model, and (ii) are super-imposed on the one or more digital images according to estimated virtual camera parameters determined from the one or more digital images, wherein the estimated virtual camera parameters include position, orientation, and focal length of the virtual camera, and wherein the estimated virtual camera parameters are automatically and continually updated during the manipulation of the predefined geometric primitives so as to accurately project the primitives in accordance with the manipulation;

constraining the primitives in relation to the items in the one or more digital images such that projections of the primitives in accordance with the estimated virtual camera parameters over corresponding ones of the items in the one or more digital images yields two-dimensional projected geometries matching those of the corresponding items in the one or more digital images so that parameters of the three-dimensional model automatically match corresponding parameters of objects depicted in the one or more images; and automatically extracting surface properties from the one or more digital images for use as textures for the geometric primitives in the three-dimensional model and; displaying the three-dimensional model.

2. The computer-assisted method of claim 1 wherein the one or more digital images are derived from one or more photographs.

* * * * *